United States Patent
Sun et al.

(10) Patent No.: US 11,833,669 B2
(45) Date of Patent: Dec. 5, 2023

(54) SUCTION-BASED END EFFECTOR WITH MIXED CUP SIZES

(71) Applicant: Dexterity, Inc., Redwood City, CA (US)

(72) Inventors: Zhouwen Sun, Redwood City, CA (US); Robert Holmberg, Mountain View, CA (US); Shitij Kumar, Redwood City, CA (US); Jeesu Baek, San Mateo, CA (US); Joseph Li, San Jose, CA (US); Kishore Ranganath Ramakrishnan, Raleigh, NC (US); Andrew Lovett, San Mateo, CA (US)

(73) Assignee: Dexterity, Inc., Redwood City, CA (US)

( * ) Notice: Subject to any disclaimer, the term of this patent is extended or adjusted under 35 U.S.C. 154(b) by 117 days.

(21) Appl. No.: 17/219,509

(22) Filed: Mar. 31, 2021

(65) Prior Publication Data

US 2022/0314460 A1    Oct. 6, 2022

(51) Int. Cl.
*B25J 15/06* (2006.01)
*B25J 9/00* (2006.01)

(52) U.S. Cl.
CPC .......... *B25J 15/0683* (2013.01); *B25J 9/0093* (2013.01)

(58) Field of Classification Search
CPC .. B25J 15/0616; B25J 15/0683; B25J 9/0093; B25J 9/1697; B25J 19/023; B66C 1/0243; B65G 47/918
USPC .......................................... 294/183, 188, 65
See application file for complete search history.

(56) References Cited

U.S. PATENT DOCUMENTS

| | | | | |
|---|---|---|---|---|
| 5,609,377 A * | 3/1997 | Tanaka | ................. | B65G 47/918 |
| | | | | 901/46 |
| 6,131,973 A * | 10/2000 | Trudeau | ............... | B65G 47/917 |
| | | | | 294/186 |
| 7,281,739 B2 * | 10/2007 | Kniss | ................... | B25J 15/0061 |
| | | | | 294/907 |
| 9,205,558 B1 * | 12/2015 | Zevenbergen | ....... | B25J 15/0052 |
| 10,611,037 B1 * | 4/2020 | Polido | ................. | B25J 15/0061 |
| 10,875,192 B2 * | 12/2020 | Tanaka | ................... | B25J 9/1669 |
| 10,902,377 B2 * | 1/2021 | Murphy | ............... | G05B 19/124 |
| 10,906,188 B1 * | 2/2021 | Sun | .......................... | B25J 9/161 |
| 2011/0254298 A1 | 10/2011 | Lomerson, Jr. | | |
| 2017/0096308 A1 | 4/2017 | Girtman | | |
| 2017/0120455 A1 | 5/2017 | Wagner | | |
| 2017/0166407 A1 * | 6/2017 | Singh | ................... | H05K 13/041 |
| 2020/0262069 A1 | 8/2020 | Douglas | | |
| 2020/0262087 A1 | 8/2020 | Douglas | | |

(Continued)

FOREIGN PATENT DOCUMENTS

CN           108584471         9/2018

*Primary Examiner* — Dean J Kramer
(74) *Attorney, Agent, or Firm* — Van Pelt, Yi & James LLP (57) ABSTRACT

An end effector is disclosed. The end effector includes a first set of one or more suction cups of a first size having a first diameter, and a second set of one or more suction cups of a second size having a second diameter that is smaller than the first diameter. The end effector further includes a first actuation mechanism configured to apply suction to at least a subset of the first set of suction cups independently of actuation of the second set of suction cups and a second actuation mechanism configured to apply suction to at least a subset of the second set of suction cups independently of actuation of the first set of suction cups.

22 Claims, 7 Drawing Sheets

(56) References Cited

U.S. PATENT DOCUMENTS

2020/0269429 A1 8/2020 Chavez
2021/0053216 A1 2/2021 Diankov

* cited by examiner

SUCTION-BASED END EFFECTOR WITH MIXED CUP SIZES

BACKGROUND OF THE INVENTION

Robots have been used to perform tasks in manufacturing and other fields. For example, robots have been used to perform tasks in environments that may be unhealthy or otherwise dangerous to humans, tasks that require the application of force greater than a human may be able to apply, and tasks that require a high degree of precision and consistency over time.

Autonomous robots perform at least some tasks in an automated manner, without requiring human control or direction. For example, automated robots have been used to perform repetitive and/or otherwise predetermined tasks and sequences of tasks, typically in a controlled environment, such as a factory. More recently, self-driving cars, delivery drones, and other autonomous vehicles have been under development.

Teleoperation in the field of robotics refers to remote operation of a robot by an operator. For example, robots have been used to perform surgery, defuse bombs, and perform other tasks under the control of a skilled human operator.

Kitting and singulation related process are traditionally very labor intensive processes for which the adoption of robotics is challenging because of the mobility restrictions and the difficulty of providing and programming a robot to perform tasks such as reaching into a bin or shelf, picking up items of arbitrary size, fragility, consistency, etc., or to perform such tasks as sorting an arbitrary mix of items. As a result, large scale kitting and/or singulation operations have continued to be human labor intensive.

Another challenge with the use of robotics in connection with kitting and singulation related process is the design and selection of end effectors. The end effector of a robotic arm is the module with which the robotic arm may engage with an item in a source pile/flow. Different types of end effectors may are better optimized for certain sizes, packaging types, weights, shapes, etc. Further, the size of the end effector or robotic arm (e.g., the wrist) to which the end effector is connected impedes the ability of the robotic arm to each into a bin/shelf, source pile/flow, etc.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to various embodiments, a robotic arm comprises an end effector with which to engage an item such as to pick up an item, move an item, etc. The end effector may be operatively connected to a wrist of the robotic arm (e.g., at a distal end of the robotic arm). In some embodiments, a computer controller controls the robotic arm in connection with operating the robotic arm to perform kitting and/or singulation processes, etc. The controlling the robotic arm may include controlling flexion, extension, rotation, abduction, and adduction movements of the wrist, etc. in connection with moving or positioning the end effector (e.g., to engage an item).

In some embodiments, the end effector includes one or more suction-type modules with which to engage an item. The one or more suction-type modules may be suction cups. As used herein, "suction cup" is used interchangeably with a "suction-type module." The robotic arm may be controlled to engage an item (e.g., touch a surface of the item) with a suction cup included in the end effector, and a suction is created between the end effector and the item. For example, a suction cup is sealed against a surface of the item and air is removed from the suction cup, thereby creating a low pressure region inside the suction area. Accordingly, the atmospheric pressure (e.g., outside the suction cup) presses down on the low pressure area (e.g., inside the suction cup) and creates the suction. The suction force may be increased by controlling the robotic arm to increase the pressure differential between the atmospheric pressure and the pressure inside the suction cup (e.g., by removing air from the suction cup, etc.). In some embodiments, the end effector may be controlled to apply a suction force to items based at least in part on the weight, size, type of packaging, etc. of the item.

End effectors on robotic arms are traditionally bulky relative to the environments in which the robotic arm operates. For example, robotic arms generally have difficulty positioning end effectors in optimal positions for engaging an item within a bin, a source pile/flow, or on a shelf, etc. Various embodiments include an end effector having various shapes (e.g., a shape of a face plate to which a suction cup is connected), sizes, profiles, etc. For example, a shape of a cross section of the end effector (e.g., a shape of the face plate) may be a square, a circle, an oval, an ellipse, a rectangle, a diamond, etc. Various other shapes may be implemented. In some embodiments, the end effector includes a plurality of suction cups. The plurality of suction cups may have various arrangements/configurations. For example, the end effector may include a plurality of sets of suction cups, and different sets of suction cups may have one or more suction cups having a size, shape, and/or arrangement, etc. that is different from a size, shape, arrangement of one or more suction cups of another set of suction cups. Any one set of suction cups may have suction cups having a size, shape, and/or arrangement, etc. Alternatively, any one set of suction cups may have suction cups having different sizes, shapes, and/or arrangements.

In various embodiments, the end effector includes a plurality of sets of suction cups. A first set of the plurality of suction cups may be arranged (e.g., on a base plate of the end effector) along a first axis, and a second set of the plurality of suction cups may be arranged along a second axis. The first axis and the second axis may be perpendicular. In some embodiments, the first axis and the second axis intersect at a midpoint of the end effector. In addition or alternatively, the first axis is a longer than the second axis.

In various embodiments, a control computer operates the robotic arm (or a system associated therewith) to actuate a suction cup on the end effector. The end effector may include a plurality of suction cups and the plurality of suction cups may be actuated independently (e.g., independently of another suction cup). For example, the control computer may select one or more suction cups (of a plurality of suction cups on the end effector) to actuate, and may send a signal to the end effector (or the robotic arm or system associated therewith) to actuate the selected one or more suction cups. In some embodiments, the plurality of suction cups includes a plurality of sets of one or more suction cups. A set of one or more suction cups may be actuated independent from another set of one or more suction cups. In some embodiments, each set of one or more suction cups may be actuated independently of the other set(s) of one or more suction cups. A suction cup (or set of one or more suction cups) may be actuated according to a grasping strategy for grasping an item. For example, the control computer may select an item to be grasped, and the control computer may determine a plan to grasp the item such as in connection with picking up the item and placing the item in another location (e.g., a receptacle for a kitting operation, or a tray or segmented conveyor for a singulation operation, etc.).

According to various embodiments, one or more suction cups on the end effector are actuated based at least in part on a grasping strategy. The grasping strategy may be determined by a control computer, and the control computer may send one or more signals (e.g., control signals) to an actuation mechanism. In some embodiments, the actuation mechanism controls actuation of at least one of the one or more suction cups on the end effector. For example, the actuation mechanism can selectively actuate a first set of one or more suction cups from among a plurality of suction cups on the end effector.

Control of a suction cup included on the end effector may include causing the suction cup to move between an inactive position and an active position. In the inactive position, the suction cup may be recessed relative to a bottom of the end effector (e.g., the base plate of the end effector) and/or relative to a position of the suction cup in the active position. In some embodiments, if the suction cup is in the inactive position, the suction cup does not engage with an item or other surface when other suction cups included on the end effector are disposed in their corresponding active positions. Conversely, in the active position, the suction cup may be extended relative to the bottom of the end effector and/or relative to a position of a suction cup in the inactive position. According to various embodiments, a set of suction cups on the end effector may be selectively controlled to engage an item such as in connection with grasping the item. Selective control of the set of suction cups may include controlling a first set of suction cups to move to an active position and/or controlling a second set of suction cups to move to an inactive position. The first set of suction cups may be actuated to generate a pressure force between at least one of the first set of suction cups and the item to be grasped.

Figure 1:
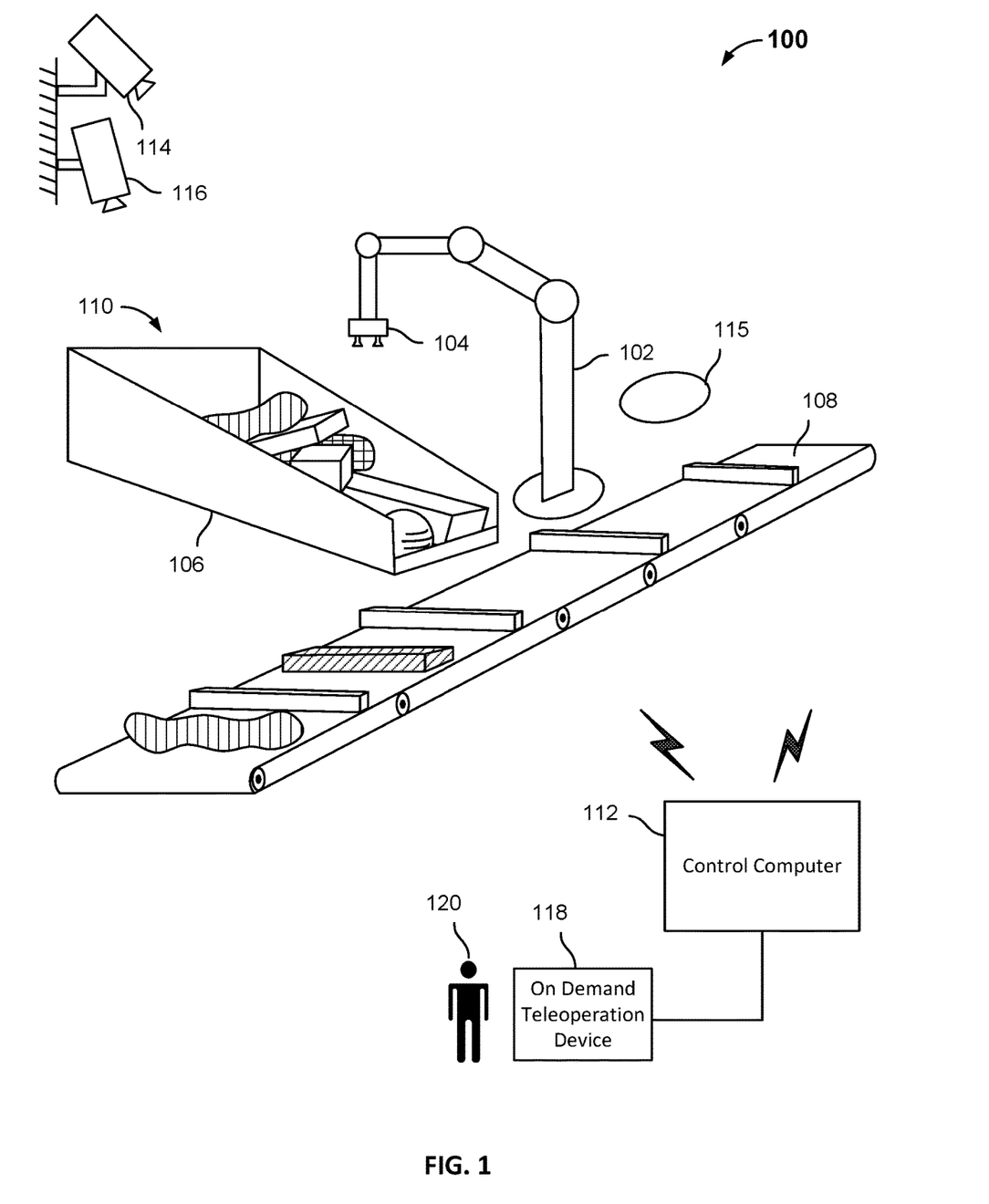
FIG. 1 is a diagram illustrating a singulation system according to various embodiments.

FIG. 1 is a diagram illustrating a singulation system according to various embodiments.

In the example shown, system 100 includes a robotic arm 102 equipped with a suction-based end effector 104. While in the example shown the end effector 104 is a suction-based end effector, in various embodiments one or more other types of end effector may be used in a singulation system as disclosed herein, including without limitation a pinch-based end effector or other types of actuated grippers. In some embodiments, end effector 104 comprises one or more suction-based ends (e.g., one or more suction cups). In various embodiments, the end effector may be actuated by one or more of suction, air pressure, pneumatics, hydraulics, or other actuation. Robotic arm 102 and end effector 104 are configured to be used to retrieve parcels or other items that arrive via chute (or bin) 106 and place each item in a corresponding location on segmented conveyor 108. In this example, items are fed into chute 106 from an intake end 110. For example, one or more human and/or robotic workers may feed items into intake end 110 of chute 106, either directly or via a conveyor or other electro-mechanical structure configured to feed items into chute 106.

In the example shown, one or more of robotic arm 102, end effector 104, and conveyor 108 are operated in coordination by control computer 112. In some implementations, control computer 112 is configured to control a plurality of robotic arms operating at one or more work stations. In various embodiments, a robotic singulation as disclosed herein may include one or more sensors from which an environment of the workspace is modeled. In the example shown in FIG. 1, system 100 includes image sensors, including in this example 3D cameras 114 and 116. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 112 includes an workspace environment state system such as vision system used to discern individual items, debris on the workspace, and each item's orientation based on sensor data such as image data provided by image sensors, including in this example 3D cameras 114 and 116. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace.

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 108. In some embodiments, the workspace environment state system produces an output (e.g., sensor data or information otherwise characterizing the workspace and/or items within the workspace) used by the robotic system to detect a state, condition, and/or attribute associated with one or more items in the workspace, and/or a state or condition associated with the robotic arm or other element of the workspace. According to various embodiments, in response to detecting (e.g., determining) the state, condition, and/or attribute associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan can include operating the robotic structure to change or adapt to the detected state, condition, and/or attribute (e.g., implement a change a manner by which an item is singulated, change a path or trajectory along which the item is singulated, change a manner by which the item is grasped, change a location on the item at which the item is grasped, etc.).

In various embodiments, a robotic system as disclosed herein includes and/or does one or more of the following, e.g., by operation of a control computer such as control computer 112:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system determines characteristics of items and/or debris or other abnormalities in the three-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system coordinates operation of a plurality of robots operating within a same workspace to singulate a plurality of items. For example, in various embodiments, the plurality of robots operate independently to pick and place items. If a risk of collision is detected, responsive action is taken to ensure the plurality of robots do not collide with one another during singulation.

Robotic system coordinates operation of multiple robots to ensure all items are placed and only one per slot/location. For example, if robot A drops an item system tasks robot B to pick it up; item placed but with improper orientation is picked up and adjusted or moved to another location by same or another robot; two or more items in a single destination slot results in robot downstream station picking one of the two or more items off the conveyor and placing the item in a new location; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Conveyor movement and/or speed controlled as needed to avoid empty locations and achieve a desired robot productivity (throughput).

In response to a determination that an item is misplaced or dropped, the system assigns a robot or, if needed, a human worker to pick it up and place back in the retrieving robot's own source pile or, if available or more optimal, on a next open slot on the conveyor.

Upstream robots controlled to intentionally leave some slots open for downstream robots to place items on the conveyor.

Downstream robots controlled to correct errors from an upstream placing an item on the conveyor (e.g., to correct the placement of an item that rests in more than one slot/tray, to update a data structure with an association between an identifier for the item with the slot in which the upstream robot placed the item, etc.).

Failure that cannot be corrected by same or another robot results in alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or to reconfigure an item to be singulated (e.g., to improve the likelihood that the item is successfully picked from the source pile/flow and placed on the conveyance structure).

Control a chute conveyor to reconfigure items within the workspace (e.g., to bring an item selected for singulation closer to a front of the chute for quicker and easier access by the robotic arm, to reposition one or more items to improve the ability of a robotic arm to grasp an item, etc.).

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics (e.g., attributes) of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Select a path for singulating an item on the conveyance structure based on an attribute of the item (e.g., a size of the selected item, a weight of the item, etc.) and/or one or more attributes (e.g., characteristics) of an item within a slot on the conveyance structure. For example, a path is determined to place the item on the placed in a slot that is adjacent to a slot comprising a tall or large item.

Determine a movement and speed of the robotic arm that singulates an item based at least in part on a speed of a conveyor belt.

Determine a trajectory of the item to be singulated based at least in part on one or more of a characteristic of the item, a characteristic of the workspace environment, and/or a characteristic of the conveyance structure (e.g., a speed of the conveyor belt).

Determine a probability of successful singulation corresponding to one or more paths/trajectories of an item to be singulated, and select a path/trajectory along which the item is to be singulated based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector be orthogonal to a surface of the item.

Update the ability of the robotic system to detect an empty slot or tray. For example, the definition of an empty slot/tray used by the robotic system to identify an empty slot/tray is updated over time.

In various embodiments, an arbitrary mix of items to be singulated may include parcels, packages, and/or letters of a variety of shapes and sizes. Some items may be standard packages one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors, or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal. According to various embodiments, in response to determining that the item is relatively heavy (e.g., that the weight exceeds a predefined threshold) and that the item is packaged in a poly-bag, or in response to determining that tenting is being caused while gasping the item, the robotic structure performs an active measure to change or adapt to the "tenting"

or to the determination that the packaging of the item. As an example, the robotic structure performs an active measure to partially lift the package and drag the package from the chute to the corresponding slot in the conveyance structure.

The robotic system may determine a path or trajectory (or a trajectory of the robotic arm/end effector in approaching the item for grasp) based on a type of packaging of the item in order to avoid tenting or to otherwise improve a grasping of the item. As an example, the robotic arm (e.g., a wrist) and/or the end effector is controlled to be orthogonal to a surface of the item from which the item is grasped. As another example, the path or trajectory of the robotic arm and/or end effector can be determined to knock an item over or otherwise reposition the item before grasping the item.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc. In some embodiments, the image data is used to determine a characteristics (e.g., an attribute) of one or more items in the workspace. As an example, the image data can be used in connection with determining (e.g., estimate) a height or dimension of an item.

The multiple cameras serve many purposes, in various embodiments. First they provide a richer full 3D view into the scene. Next they operate in cohesion to minimize the errors due to package shininess when light reflecting off a package and into a camera may disrupt its operation; in this case another camera at a different location provides a backup. In some embodiments, they can be selectively triggered by a predictive vision algorithm that determines which camera has the best viewing angle and/or lowest error rate for picking a particular package; as such each package has the optimal camera looking at it. In some embodiments, one or more cameras are mounted on an actuated base, of which the system can change the position and orientation to provide a more optimal perception (e.g., view) of a package. In embodiments, one or more cameras are mounted on the robotic structure (e.g., on the end effector of the robotic arm, etc.).

Another purpose served by cameras is, in various embodiments, to detect any sort of unforeseen error in robot operation or any disruption to the environment. Cameras placed on the robot and on the environment have different error and accuracy profiles. The cameras on the robot can be more accurate since they are rigidly fixed to the robot but slower to use because use of such cameras require the robot to slow down or stall. Cameras in the environment have a stable view and are effectively faster because the robot can multi-task and do something else while a camera is taking a photo. But if someone moves or shakes the camera stand, the cameras may become out of sync with the robot and cause errors. In various embodiments, images from robot and non-robot cameras are combined (e.g., occasionally or on a package miss), to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some embodiments gyros and/or accelerometers on the cameras may be used to filter or compensate for the motion of the mounting base.

According to various embodiments, system 100 may include one or more sensors other than or in addition to a plurality of cameras, such as one or more of an infrared sensor array, a laser array, a scale, a gyroscope, a current sensor, a voltage sensor, a power sensor, and the like. Information received from the various other sensors is used in determining one or more attributes of the item to be singulated and/or attributes of another item or object within the workspace, etc.

Referring to FIG. 1, in various embodiments, robotic arm 102 is driven by one or more motors, e.g., one or more motors at each movable joint or mount location. In some embodiments, the work required to drive to robotic arm 102 (e.g., to move the robotic arm as the robotic arm attempts to singulate an item) is indicative of one or more characteristics of the item to be singulated. For example, in some embodiments, a weight of the item may be computed (or estimated) based on the work required to drive the robotic arm 102 while the item is in its grasp. In various embodiments, the work required to drive the robotic arm 102 is measured using a current sensor, a voltage sensor, a power sensor, and/or the like, or some combination thereof. In response to determining the weight of the item during singulation, the robotic system determines a path/trajectory of an item to be singulated based at least in part on the weight of the item. The robotic system may perform an active measure to adapt to the weight of the item such as, for example, updating the path or trajectory in response to determining the weight of the item. In some embodiments, in response to determining that the weight of the item is greater than a predefined threshold, robotic system 100 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, the robotic structure adjusts the speed at which the robotic arm (and the item) is moved. For example, the larger the weight of the item, the greater the shear forces between the item and end effector 104 as the robotic arm 102 is moved. Further, the shear forces can increase as the speed at which the robotic arm is operated (e.g., the speed at which the robotic arm moves the item). Accordingly, robotic system 100 can control the speed of the robotic arm 102 based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm 102 or the end effector 104. However, force sensors are relatively expensive and thus low-level hardware information, such as motor torque or a measure of the work used by the motor is an effective manner by which to determine (e.g., estimate) the weight of the item.

Information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace. The information received from the one or more sensor arrays may be used in connection with determining a height of the item to be singulated and/or another item or other object within the workspace. In some embodiments, the robotic system determines a path or trajectory (or updates the path or trajectory) based at least in part on height of the item to be singulated and/or another item or other object within the workspace. For example, the robotic system determines a location on the conveyor at which the item is to be placed based at least in part on a height (or other dimension) of one or more other items on the conveyor. Planning to place an item in a slot/tray adjacent to another slot/tray comprising a relatively large (e.g., tall, wide, etc.) item can increase the likelihood of a collision during singulation. In addition, a relatively large item on the conveyor can impede the ability of the robotic system to obtain information for adjacent items. The line of sight of the vision system may be blocked by a relatively large item and thus the sensor data may not include accurate information for adjacent items (or other items within close proximity to the large item). As another example, if the item includes an identifier or label on a side facing a relatively large item, or on a surface close to the large item, the vision system may be unable to locate or read the identifier or label.

Referring further to FIG. 1, in the example shown system 100 further includes an on-demand teleoperation device 118 usable by a human worker 120 to operate one or more of robotic arm 102, end effector 104, and conveyor 108 by teleoperation. In some embodiments, control computer 112 is configured to attempt to grasp and place items in a fully automated mode. However, if after attempting to operate in fully automated mode control computer 112 determines it has no (further) strategies available to grasp one or more items, in various embodiments control computer 112 sends an alert to obtain assistance from a human operator via teleoperation, e.g., by human operator 120 using teleoperation device 118. For example, in some embodiments, in response to detecting a state or condition affecting item flow through chute 106, control computer 112 may attempt to perform one or more actions to facilitate singulation. If fully automated attempts to response to the detected state or condition are determined not to have resolved the state or condition, control computer may prompt human operator 120 to address the state or condition, e.g., via teleoperation using on-demand teleoperation device 118. In various embodiments, control computer 112 may display a user interface or other interface that identifies the state or condition and/or presents human selectable options to control the robotic arm 102, end effector 104, and/or other elements and instrumentalities as disclosed herein (e.g., blowers, shakers, chute conveyors, etc.) to alter the state or condition.

In various embodiments, control computer 112 uses image data from cameras such as cameras 114 and 116 to provide a visual display of the scene to human worker 120 to facilitate teleoperation. For example, control computer 112 may display a view of the pile of items in chute 106. In some embodiments, segmentation processing is performed by control computer 112 on image data generated by cameras 114 and 116 to discern item/object boundaries. Masking techniques may be used to highlight individual items, e.g., using different colors. The operator 120 may use the visual display of the scene to identify the item(s) to be grasped and use teleoperation device 118 to control the robotic arm 102 and end effector 104 to pick the item(s) from chute 106 and place each in a corresponding location on conveyor 108. In various embodiments, once the item(s) for which human intervention was prompted have been placed on the conveyor, the system 100 resume fully automated operation. In various embodiments, in the event of human intervention, the robotic system observes the human worker (e.g., manual task completion, task completion using a robotic arm and end effector via teleoperation) and attempts to learn a strategy to (better) complete the task in an autonomous mode in future. For example, the system may learn a strategy to grasp an item, e.g., by observing the places on the item at which a human worker grasps the item and/or by remembering how the human worker used the robotic arm and end effector to grasp the item via teleoperation.

In some embodiments, system 100 invokes assistance from human operator 120 in response to determining that an abnormality in the operation of system 100 exists. An example of an abnormality is a lack of a threshold pressure being attained between end effector 104 and the item during singulation of the item. In response to detecting that the pressure attained between end effector 104 and the item is less than a threshold pressure value, robot system 100 can perform a diagnostics process in connection with assessing whether robot system 100 is performing normally. For example, system 100 can perform a diagnostics of the ability of end effector 104 to engage an item and attain a predetermined threshold pressure value. In response to determining that system 100 is not performing normally (e.g., that the end effector 104 is not able to engage an item and attain a predetermined threshold pressure value), system 100 invokes assistance from human operator 120. In some embodiments, control computer 112 sends an alert to human operator 120. The alert can indicate the basis of the problem (e.g., an indication that the end effector is unable to engage the item and attain a predetermined threshold pressure value). For example, the alert can provide a recommended or requested remedial action to human operator 120.

According to various embodiments, in response to determining that current operation of system 100 deviates from expected normal operation of system 100, system 100 determines to perform a diagnostic on system 100. System 100 can perform the diagnostic on a part of the system 100 that system 100 determines, based at least in part on sensor data (e.g., the current sensor data), is deviating from normal operation or that is within a threshold range or percentage of being in deviation from normal operation. In the case of the measurement of pressure attained by end effector 104 described above, system 100 can determine the particular end effector(s) for which a diagnostic process is to be performed. In some embodiments, in response to performing the diagnostic process and determining a result of the diagnostic process indicates that system 100 (or a component thereof) is deviating from normal operation or is otherwise within the threshold range or percentage of being in deviation from normal operation, system 100 implements one or more active measures. Examples of the active measures include replacing the component (e.g., switching an end effector), determining to operate the system 100 in a manner that does not use the component in deviation of normal operation or that does not place a strain on the component in excess of a predefined strain threshold, and/or invoking human intervention (e.g., notifying human operator 120 of the deviation). Various other active measures can be implemented.

Continuing with the example described above in connection with FIG. 1, system 100 determines to perform a diagnostic process at least partly in response to system 100 determining that system 100 is deviating from normal operation or that the diagnostic process is to be performed in connection with assessing whether a remedial active measure is to be implemented. In response to determining that the pressure attained by end effector 104 while the robotic arm has picked up an item deviates from an expected normal operation of end effector 104, system 100 determines to perform a diagnostic with respect to operation of the end effector (e.g., one or more suction cups on the end effector) that is determined to deviate from normal operation. According to various embodiments, the diagnostic process for performing a diagnostic with respect to an end effector includes operating robotic arm 102 to move to a predetermined location and engage the end effector with a predetermined surface such as, in this example, surface 115. Surface 115 may be located within workspace 110. In some embodiments, surface 115 is a part of chute 106 or is operatively connected to chute 106 or conveyor 108. When the end effector is engaged to the predetermined surface, system 100 controls the end effector to grasp the predetermined surface. In response to controlling the end effector to grasp the predetermined surface, system 100 obtains sensor data pertaining to a measurement of a grasp strength with which the end effector grasps the predetermined surface. For example, in response to engaging the end effector with surface 115, system 100 controls the end effector to apply a suction to surface 115. System 100 obtains sensor data including one or more values of the pressure attained between the end effector and surface 115. System 100 then determines whether the pressure attained by the end effector in grasping surface 115 deviates from an expected normal operation of grasping surface 115. In some embodiments, system 100 compares the sensor data including one or more values of the pressure attained between the end effector and surface 115 with one or more predetermined ranges or threshold values mapped to a normal operation of the end effector. If the pressure attained between the end effector and surface 115 is inconsistent with normal operation of the end effector (e.g., if one or more values of the pressure attained between the end effector and surface 115 falls outside one or more predetermined ranges or threshold values mapped to a normal operation of the end effector), system 110 determines that the end effector is not working properly (e.g., the end effector is deviating from normal operation).

According to various embodiments, in response to system 100 determining that the end effector is not working properly, system 100 updates the plan to implement one or more active measures based at least in part on such determination that the end effector is not working properly. Such an active measure includes alerting human operator 120 that the end effector is not working. For example, system 100 sends a notification to the human operator 120 of the deviation from normal operation. In some embodiments, system 100 provides human operator 120 with one or more recommended active measures. In response to receiving the notification of the deviation from normal operation, the human operator 120 can implement a human intervention to replace or repair the applicable end effector. In some embodiments, human operator 120 controls system 100 using on demand teleoperation device 118 to implement an active measure such as controlling the robotic arm 102 to replace the applicable end effector. In some embodiments, human operator 120 can select at least one of the one or more recommended active measures, and in response to such selection, system 100 controls robotic arm 102 to implement the selected active measure (e.g., without additional human intervention).

In various embodiments, control computer 112 operates robotic arm102 (or a system associated therewith) to actuate a suction cup on the end effector 104. The end effector 104 may include a plurality of suction cups and the plurality of suction cups may be actuated independently (e.g., independently of another suction cup). For example, the control computer 112 may select one or more suction cups (of a plurality of suction cups on the end effector) to actuate, and may send a signal to the end effector 104 (or the robotic arm or system associated therewith) to actuate the selected one or more suction cups. In some embodiments, the plurality of suction cups includes a plurality of sets of one or more suction cups. A set of one or more suction cups may be actuated independent from another set of one or more suction cups. In some embodiments, each set of one or more suction cups may be actuated independently of the other set(s) of one or more suction cups. A suction cup (or set of one or more suction cups) may be actuated according to a grasping strategy for grasping an item. For example, the control computer 112 may select an item to be grasped, and the control computer 112 may determine a plan to grasp the item such as in connection with picking up the item and placing the item in another location (e.g., a receptacle for a kitting operation, or a tray or segmented conveyor for a singulation operation, etc.).

According to various embodiments, one or more suction cups on the end effector 104 are actuated based at least in part on a grasping strategy. The grasping strategy may be determined by a control computer 112, and the control computer 112 may send one or more signals (e.g., control signals) to an actuation mechanism. In some embodiments, the actuation mechanism controls actuation of at least one of the one or more suction cups on the end effector 104. For example, the actuation mechanism can selectively actuate a first set of one or more suction cups from among a plurality of suction cups on the end effector. The actuation mechanism may be a module running on control computer 112, or a module operatively connected to the robotic arm 102 and/or end effector 104.

Control of a suction cup included on the end effector 104 may include causing the suction cup to move between an inactive position and an active position. In the inactive position, the suction cup may be recessed relative to a bottom of the end effector (e.g., the base plate of the end effector) and/or relative to a position of the suction cup in the active position. In some embodiments, if the suction cup is in the inactive position, the suction cup does not engage with an item or other surface when other suction cups included on the end effector are disposed in their corresponding active positions. Conversely, in the active position, the suction cup may be extended relative to the bottom of the end effector 104 and/or relative to a position of a suction cup in the inactive position. According to various embodiments, a set of suction cups on the end effector 104 may be selectively controlled to engage an item such as in connection with grasping the item. Selective control of the set of suction cups may include controlling a first set of suction cups to move to an active position and/or controlling a second set of suction cups to move to an inactive position. The first set of suction cups may be actuated to generate a pressure force between at least one of the first set of suction cups and the item to be grasped.

Although the example described in connection with a singulation operation (e.g., the use of robotic arm 102 to singulate an item from chute 106 to a position on conveyor 108), various embodiments include a robotic arm that performs a kitting operation. For example, the robotic arm including end effector 104 (e.g., which may include one or more suction cups) may be used to pick one or more items from corresponding determined locations (e.g., from a tray on a shelf) and arrange or assemble the items to form a kit (e.g., including placing the items in a box, tray, or other receptacle). The kit may be formed based at least in part on an order (e.g., an order received via an electronic commerce website).

Figure 2A:
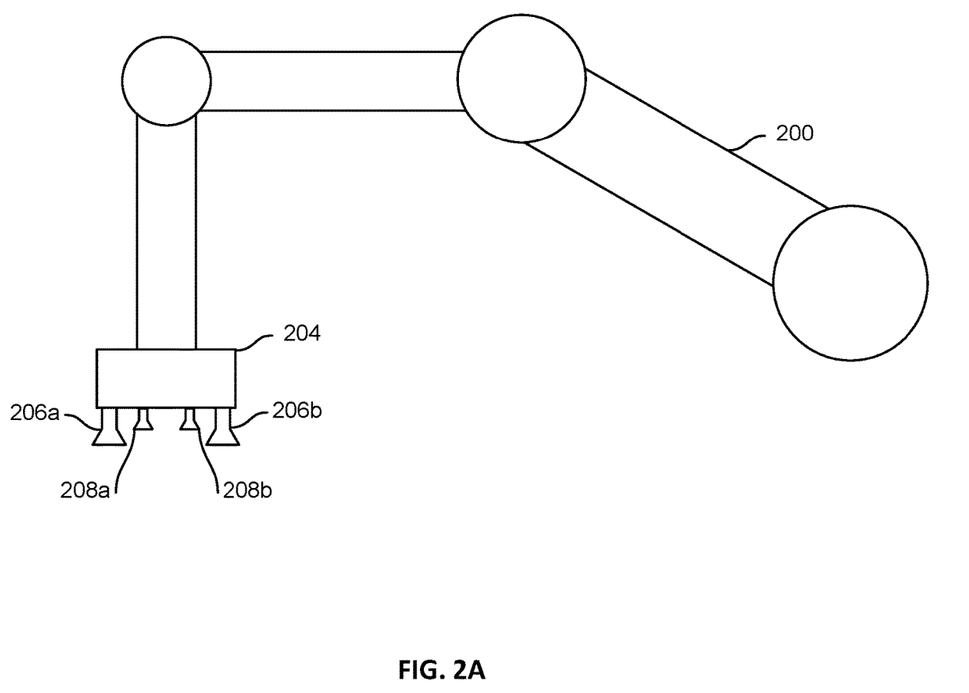
FIG. 2A is a diagram illustrating a robotic arm according to various embodiments.

FIG. 2A is a diagram illustrating a robotic arm according to various embodiments. In some embodiments, robotic arm 200 is implemented in system 100 of FIG. 1.

In the example illustrated in FIG. 2A, robotic arm 200 includes an end effector 204 including a plurality of suction cups (e.g., 206a, 206b, 208a, and/or 208b). In some embodiments, suction cups 206a, 206b, 208a, and/or 208b may have varying sizes, shapes, and arrangements. The end effector 204 may include one or more sets of suction cups, and each set of suction cups may include one or more suction cups. Suction cups 206a and 206b of the example illustrated in FIG. 2A may correspond to a first set of suction cups, and suction cups 208a and 208b may correspond to a section set of suction cups.

In some embodiments, the end effector 204 includes a set of suction cups including one or more suction cups that are larger (e.g., longer and/or larger diameter, etc.) than one or more suction cups in another set of suction cups. For example, suction cups 206a and 206b are larger than suction cups 208a and 208b. Suction cups 206a and 206b may have a diameter that is larger than suction cups 208a and 208b. In some embodiments, suction cups 206a and 206b extend further from the end effector 204 (e.g., from the base plate of the end effector 204) than suction cups 208a and 208b. For example, suction cups 206a and 206b may be longer than suction cups 208a and 208b. As another example, suction cups 206a and 206b may be configured to move from a recessed position to an extended position in response to suction cups 206a and 206b being actuated (e.g., suction cups 206a and 206b may be in an extended position and suction cups 208a and 208b may be in the recessed position).

In some embodiments, an actuation mechanism is operatively connected to the end effector 204 (e.g., the suction cups 206a, 206b, 208a, and/or 208b). The actuation mechanism may actuate at least a subset of the suction cups on end effector 204 independent from at least another subset of the suction cups. For example, suction cups 206a and 206b may be actuated independent from actuation of suction cups 208a and 208b. In some embodiments, each suction cup on the end effector may be actuated independently.

As illustrated in FIG. 2A, the end effector 204 may be configured to have larger suction cups (e.g., suction cups 206a and 206b) arranged to be outside relatively smaller suction cups 208a and 208b. For example, suction cups 206a and 206b may arranged at an edge of the end effector 204 (e.g., an outer edge of a base plate of the end effector 204). The larger suction cups may be arranged at an outer circumference of the end effector 204 (e.g., an outer circumference of a base plate of the end effector 204). In some embodiments, larger suction (e.g., longer suction cups or suction cups that extend further from the end effector 204) are disposed at locations on the end effector 204 that improve the ability of the end effector to engage an item that is disposed in a corner of a tray, bin, or other receptacle. For example, the larger suction cups may be arranged at one or more corners of the end effector 204.

Figure 2B:
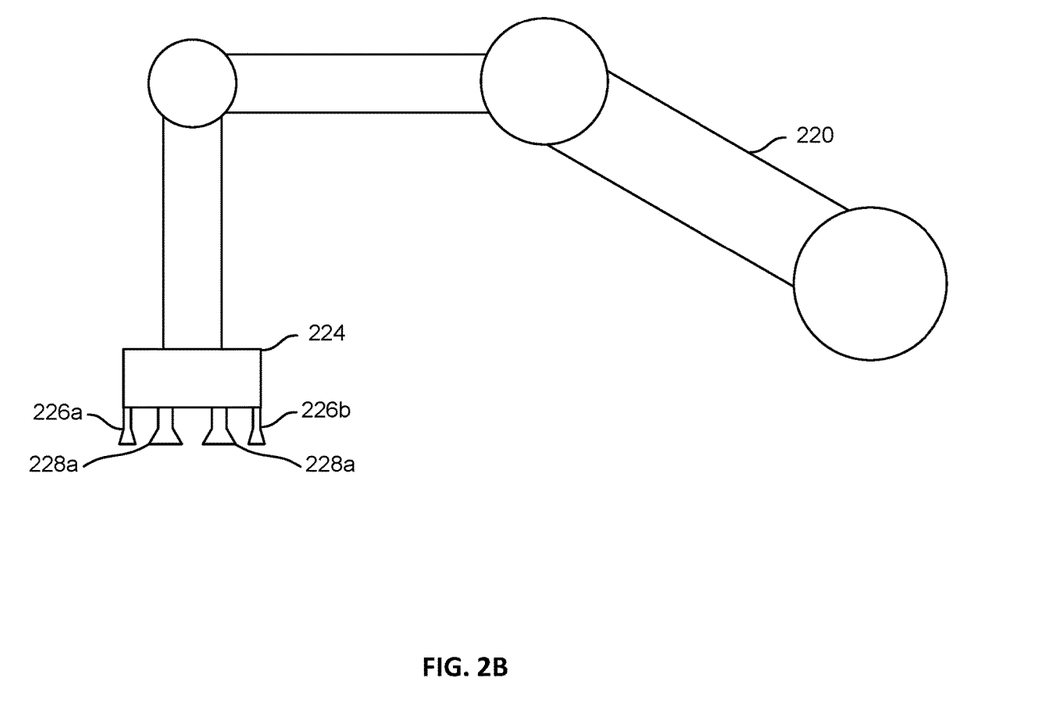
FIG. 2B is a diagram illustrating a robotic arm according to various embodiments.

FIG. 2B is a diagram illustrating a robotic arm according to various embodiments. In some embodiments, robotic arm 200 is implemented in system 100 of FIG. 1.

In the example illustrated in FIG. 2B, robotic arm 220 includes an end effector 224 including a plurality of suction cups (e.g., 226a, 226b, 228a, and/or 228b). In some embodiments, suction cups 226a, 226b, 228a, and/or 228b may have various sizes and shapes. The end effector 224 may include one or more sets of suction cups, and each set of suction cups may include one or more suction cups. Suction cups 226a and 226b of the example illustrated in FIG. 2B may correspond to a first set of suction cups, and suction cups 228a and 228b may correspond to a section set of suction cups.

In some embodiments, an actuation mechanism is operatively connected to the end effector 224 (e.g., the suction 226a, 226b, 228a, and/or 228b). The actuation mechanism may actuate at least a subset of the suction cups on end effector 224 independent from at least another subset of the suction cups. For example, suction cups 226a and 226b may be actuated independent from actuation of suction cups 228a and 228b. In some embodiments, each suction cup on the end effector may be actuated independently.

As illustrated in FIG. 2B, the end effector 224 may be configured to have smaller suction cups (e.g., suction cups 226a and 226b) arranged to be outside relatively larger suction cups 228a and 228b. For example, suction cups 226a and 226b may be arranged at an edge of the end effector 224 (e.g., an outer edge of a base plate of the end effector 204). The smaller suction cups may be arranged at an outer circumference of the end effector 224 (e.g., an outer circumference of a base plate of the end effector 224). The relatively smaller suction cups may be smaller than another set of suction cups with respect to one or more characteristics, such as length, diameter, a distance a bottom surface of the suction is from a base of the end effector, etc.

According to various embodiments, the suctions cups on an end effector may be arranged according to various arrangements, shapes, etc. A first set of suction cups on the end effector may be arranged according to a first configuration and a second set of suction cups may be arranged according to a second configuration. As an example, the first set of suction cups may be disposed along a first axis, and/or a second set of suction cups may be disposed along a second axis. In some implementations, the first axis intersects with the second axis.

In some embodiments, the suction cups on an end effector may configured and/or arranged based at least in part on a workspace of the system in which the end effector is to be deployed. In contrast to a kitting operation, a robotic arm may be less likely to be required to pick an item from a corner of a tray, box, or other receptacle during a singulation operation. Accordingly, in a singulation operation implementation according to which a robotic arm picks an item from a source flow or pile, the configuration and/or arrangement of suction cups (e.g., a number of suction cups, sizes of suction cups, shapes of suction cup, an arrangement of suction cups, etc.) may be selected to be optimal with respect to (e.g., to achieve a preset threshold with respect to) a suction strength or a grasping and/or release speed. In a kitting operation according to which a robotic arm picks an item from tray, box, or receptacle disposed on a shelf (e.g., disposed on a kitting shelf system), the configuration and/or arrangement of suction cups (e.g., a number of suction cups, sizes of suction cups, shapes of suction cup, an arrangement of suction cups, etc.) may be selected to be optimal with respect to versatility in engaging items at different angles or within more constrained environments (e.g., the end effector may be configured with suction cups in corners to enable the end effector to reach items in corners, etc.). As an example, an end effector to be deployed with respect to a kitting operation comprise a base having a diamond shape, and at least one suction cup may be disposed on at least one corner of the base.

According to various embodiments, the suction cups on an end effector may configured and/or arranged based at least in part on an application, function or responsibility to be performed, and/or one or more attributes of an item. As an example, in the context of selecting suction cups or configurations thereof based at least in part on an application, the suction cups may be configured and/or arranged based at least in part on whether the application of the robotic arm is singulation, kitting, shopping, etc. As another example, in the context of selecting suction cups or configurations thereof based at least in part on a function or responsibility of the robotic arm (or end effector), the suction cups may be configured and/or arranged based at least in part on whether the robotic arm (or end effector) is to pick up a tray, pick up an item, and/or apply a label to an item, etc. As another example, in the context of selecting suction cups or configurations thereof based at least in part on one or more attributes of the item, the suction cups may be configured and/or arranged based at least in part on a size of an item (or range of expected sizes of items to be picked by end effector), a shape of the item (or range of expected shapes of items to be picked by end effector), a material of the item (or range of expected materials of items to be picked by end effector), and/or a surface characteristics of the item (or range of expected surface characteristics of items to be picked by end effector), etc.

Figure 3A:
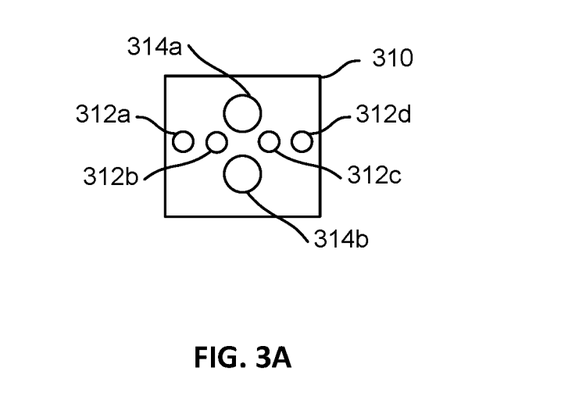
FIG. 3A is a diagram illustrating a bottom view of an end effector according to various embodiments.

FIG. 3A is a diagram illustrating a bottom view of an end effector according to various embodiments. In some embodiments, system 100 of FIG. 1 implements end effector 310.

In the example illustrated in FIG. 3A, end effector 310 having a square face (e.g., a square base) comprises a plurality of suction cups and at least a first subset of the plurality of suction cups is different from a second subset of the plurality of suctions cups. For example, suction cups 314a and 314b may be larger than suction cups 312a, 312b, 312c, and/or 312d. Suction cups 314a and 314b may have a diameter that is larger than diameter of one or more of suction cups 312a, 312b, 312c, and/or 312d.

An actuation mechanism (not shown) operatively connected to end effector 310 may actuate a first suction cup independent from actuation of a second suction cup. In some embodiments, a suction cup may be actuated according to a set of suction cups to which the suction cup belongs. The actuation mechanism may actuate one or more of the suction cups on the end effector 330 based at least in part on a plan (e.g., a grasping strategy included in a plan for a singulation operation, a plan for a kitting operation, etc.).

In some embodiments, a first set of suction cups (e.g., suction cups 314a and 314b) may be disposed on the end effector 310 along a first axis and a second set of suction cups (e.g., 312a, 312b, 312c, and/or 312d) may be disposed on the end effector along a second axis. The first axis may intersect the second axis.

Figure 3B:
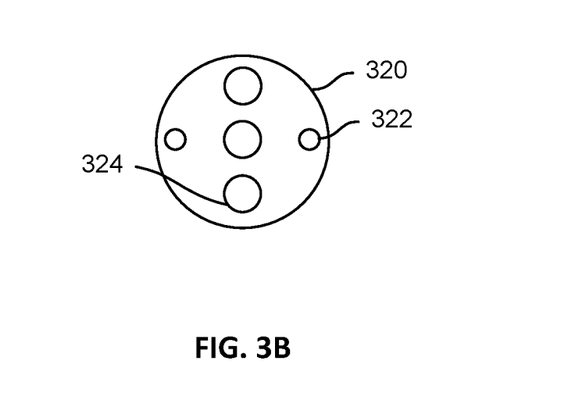
FIG. 3B is a diagram illustrating a bottom view of an end effector according to various embodiments.

FIG. 3B is a diagram illustrating a bottom view of an end effector according to various embodiments. In some embodiments, system 100 of FIG. 1 implements end effector 320.

In the example illustrated in FIG. 3B, end effector 320 having a round face (e.g., a circle base) comprises a plurality of suction cups and at least a first subset of the plurality of suction cups is different from a second subset of the plurality of suctions cups. For example, suction cup 324 may be larger than suction cup 322. Suction cup 324 may have a diameter that is larger than diameter of suction cup 322.

An actuation mechanism (not shown) operatively connected to end effector 320 may actuate suction cup 322 independent from actuation of suction cup 324. The actuation mechanism may actuate one or more of the suction cups on the end effector 320 based at least in part on a plan (e.g., a grasping strategy included in a plan for a singulation operation, a plan for a kitting operation, etc.).

In some embodiments, a first set of suction cups (e.g., a set to which suction cup 322 belongs) may be disposed on the end effector 320 along a first axis and a second set of suction cups (e.g., a set to which suction cup 324 belongs) may be disposed on the end effector along a second axis. The first axis may intersect the second axis.

Figure 3C:
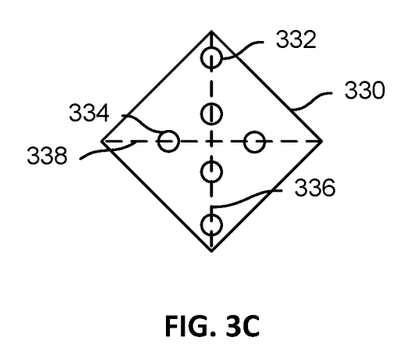
FIG. 3C is a diagram illustrating a bottom view of an end effector according to various embodiments.

FIG. 3C is a diagram illustrating a bottom view of an end effector according to various embodiments. In some embodiments, system 100 of FIG. 1 implements end effector 330.

In the example illustrated in FIG. 3C, end effector 330 having a diamond face (e.g., a diamond base) comprises a plurality of suction cups and at least at least one suction cup (e.g., suction cup 332) is disposed in the corner of the end effector 330. Suction cups located in the corner of the end effector may be used (e.g., actuated) in connection with grasping an item in a corner of a box, tray, or other receptacle, or other size-restricted space.

An actuation mechanism (not shown) operatively connected to end effector 330 may actuate suction cup 332 independent from actuation of suction cup 334. The actuation mechanism may actuate one or more of the suction cups on the end effector 330 based at least in part on a plan (e.g., a grasping strategy included in a plan for a singulation operation, a plan for a kitting operation, etc.).

In some embodiments, a first set of suction cups (e.g., a set to which suction cup 332 belongs) may be disposed on the end effector 330 along a first axis 336 and a second set of suction cups (e.g., a set to which suction cup 334 belongs) may be disposed on the end effector along a second axis 338. The first axis 336 may intersect the second axis 338. The first axis 336 may be a different length than the second axis 338.

Figure 3D:
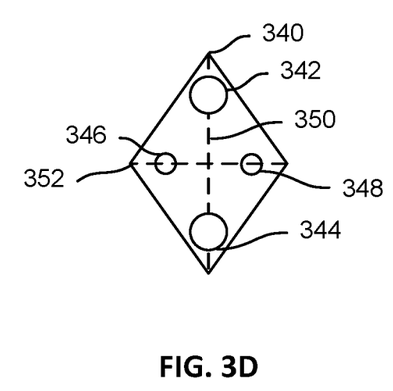

FIG. 3D is a diagram illustrating a bottom view of an end effector according to various embodiments. In some embodiments, system 100 of FIG. 1 implements end effector 340.

In the example illustrated in FIG. 3D, end effector 340 having an elongated diamond face (e.g., an elongated diamond base) comprises a plurality of suction cups and at least one suction cup (e.g., suction cup 342, 344, 346, and/or 348) is disposed in the corner of the end effector 340. Suction cups located in the corner of the end effector may be used (e.g., actuated) in connection with grasping an item in a corner of a box, tray, or other receptacle, or other size-restricted space. For example, to grab a long and narrow box, smaller end suction cups 346 and 348 and one large suction cup (e.g., suction cup 342 or 344) may be actuated. In some embodiments, each of the suction cups may be actuated or controlled independent of each other. Accordingly, various subsets of the plurality of suction cups may be actuated in connection with grasping an item. The corresponding plan for singulating/kitting or otherwise grasping the item may define the subset of suction cups that are to be activated in connection with grasping the item.

An actuation mechanism (not shown) operatively connected to end effector 340 may actuate suction cup 342 independent from actuation of one or more of suction cups 344, 346, and/or 348. The actuation mechanism may actuate one or more of the suction cups on the end effector 340 based at least in part on a plan (e.g., a grasping strategy included in a plan for a singulation operation, a plan for a kitting operation, etc.).

In some embodiments, a first set of suction cups (e.g., a set to which suction cups 342 and 344 belong) may be disposed on the end effector 340 along a first axis 350 and a second set of suction cups (e.g., a set to which suction cups 346 and 348 belong) may be disposed on the end effector along a second axis 352. The first axis 350 may intersect the second axis 352. The first axis 350 may be a different length than the second axis 352.

Figure 4:
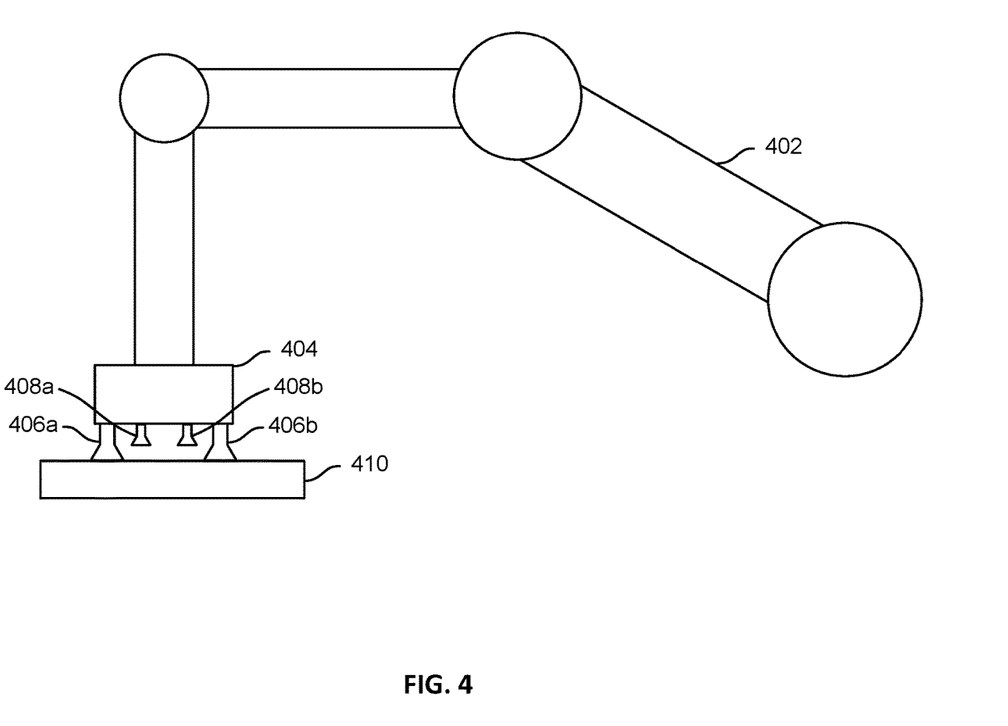
FIG. 4 is a diagram illustrating a robotic arm according to various embodiments.

FIG. 4 is a diagram illustrating a robotic arm according to various embodiments. In some embodiments, system 100 of FIG. 1 may implement robotic arm 402.

In the example illustrated in FIG. 4, robotic arm 402 includes an end effector 404 including a plurality of suction cups (e.g., 406a, 406b, 408a, and/or 408b). In some embodiments, suction cups 406a, 406b, 408a, and/or 408b may have varying sizes, shapes, and arrangements. The end effector 404 may include one or more sets of suction cups, and each set of suction cups may include one or more suction cups. Suction cups 406a and 406b, of the example illustrated in FIG. 4 may correspond to a first set of suction cups, and suction cups 408a and 408b may correspond to a section set of suction cups.

According to various embodiments, end effector 404 uses at least a subset of the suction cups to engage an item (e.g., item 410) in connection with grasping item 410. An actuation mechanism may operatively connected to the end effector 404 (e.g., the suction cups 406a, 406b, 408a, and/or 408b). The actuation mechanism may actuate at least a subset of the suction cups on end effector 404 independent from at least another subset of the suction cups. In the example illustrated in FIG. 4, suction cups 406a and 406b (are used to) engage item 410, and suction cups 406a and 406b may be actuated independent from actuation of suction cups 408a and 408b (e.g., suction cups 408a and 408b may not be actuated in connection with grasping item 410). As another example, all of suction cups 406a, 406b, 408a, and 408b may be actuated but only suction cups 406a and 406b engage item 410 because suction cups 406a and 406b are longer (or extend further) than suction cups 408a and 408b. In some embodiments, each suction cup on the end effector may be actuated independently.

According to various embodiments, actuation of a suction cup may be based on a grasping strategy and/or a plan for picking and placing the item (e.g., a plan for singulating the item, a plan for kitting the item, etc.). As an example, actuation of a suction cup may include moving a suction cup between a recessed position and an extended position (e.g., moving the suction cup to the extended position in connection with grasping an item with that particular suction cup). As another example, actuation of a suction cup may include causing a pressure differential between the atmospheric pressure and the pressure inside the suction cup (e.g., by removing air from the suction cup, etc.). In connection with releasing an item from the end effector, actuation of the suction cup may include causing air to be blown out from the suction cup (e.g., to cause air to push the item away from the end effector). For example, air flow used to form a suction force may be reversed to cause air to flow from the suction cup (e.g., an outlet in the suction cup).

As illustrated in FIG. 4, the end effector 404 may be configured to have larger suction cups (e.g., suction cups 406a and 406b) arranged to be outside relatively smaller suction cups 408a and 408b. For example, suction cups 406a and 406b may arranged at an edge of the end effector 404 (e.g., an outer edge of a base plate of the end effector 404). The larger suction cups may be arranged at an outer circumference of the end effector 404 (e.g., an outer circumference of a base plate of the end effector 404). In some embodiments, larger suction (e.g., longer suction cups or suction cups that extend further from the end effector 404) are disposed at locations on the end effector 404 that improve the ability of the end effector to engage an item that is disposed in a corner of a tray, bin, or other receptacle. For example, the larger suction cups may be arranged at one or more corners of the end effector 404.

Figure 5A:
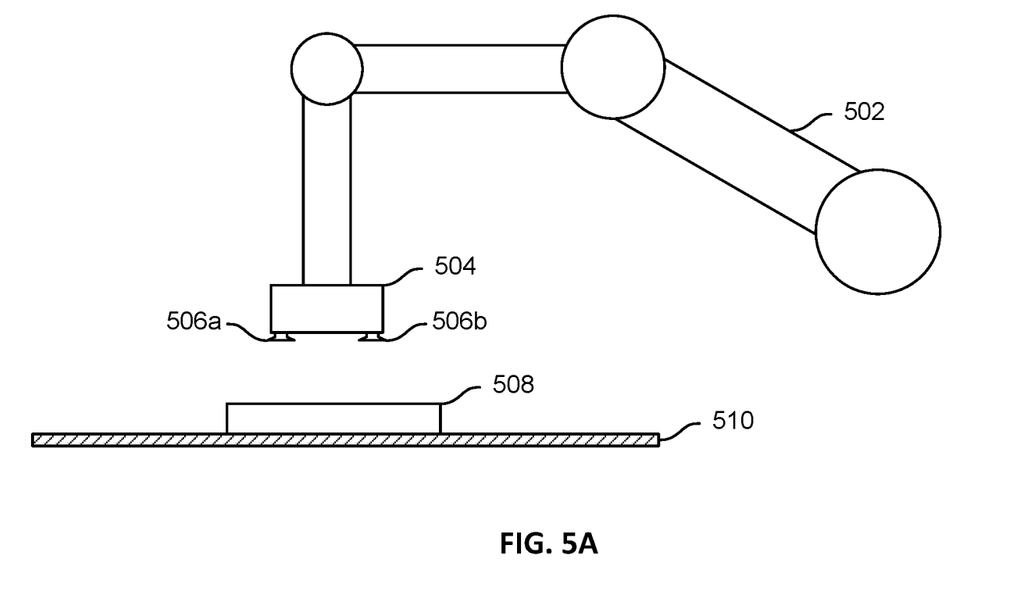
FIG. 5A is a diagram illustrating a robotic arm according to various embodiments.
Figure 5B:
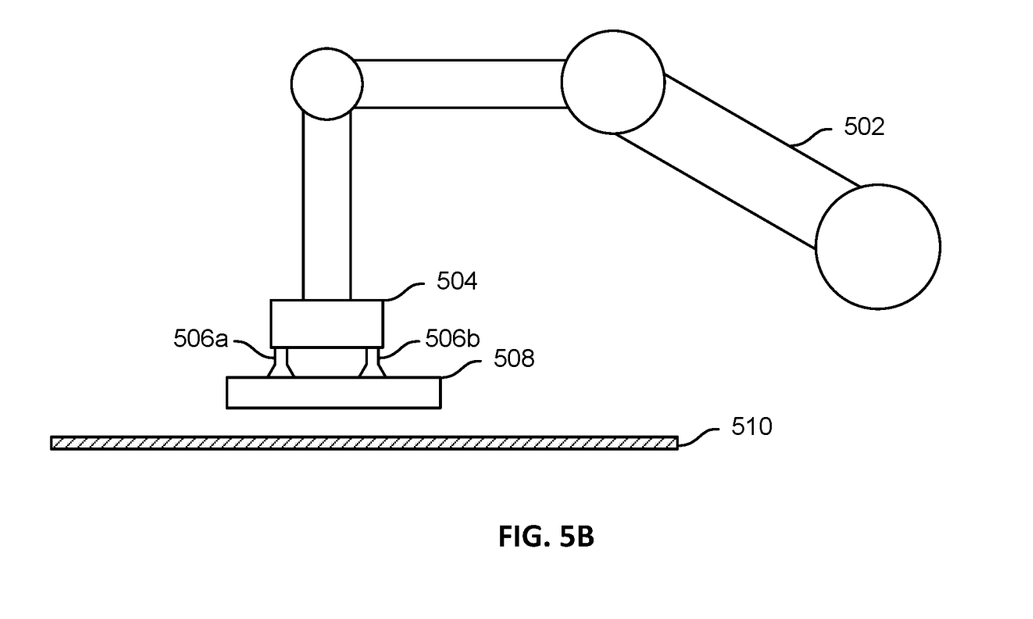
FIG. 5B is a diagram illustrating a robotic arm according to various embodiments.

FIG. 5A is a diagram illustrating a robotic arm according to various embodiments. FIG. 5B is a diagram illustrating a robotic arm according to various embodiments. In some embodiments, system 100 may implement robotic arm 502 of FIGS. 5A and 5B.

In the examples illustrated in FIGS. 5A and 5B, robotic arm 502 is moved to engage item 508 and to pick item 508 from surface 510. In connection with grasping item 508, one or more suction cups on end effector 504 may be actuated. For example, suction cups 506a and 506b may be actuated to grasp item 508. As illustrated in FIGS. 5A and 5B, suction cups 506a and 506b may be disposed in a recessed position with respect to a housing of end effector 504, and when end effector 504 engages item, suction cups 506a and 506b may be actuated. The actuation of suction cups 506a and 506b may include moving suction cups 506a and 506b to an extended position. Moving the suction cups 506a and 506b to an extended position may include extend tube to push cup out away from a base or body of end effector 504. In some embodiments, suction cups may be moved to an extended position in response to a determination that the robotic arm 502 and/or end effector 504 is to reach further into a bin and/or among a clutter of items to pick out an item (e.g., a small item that is disposed at the back or bottom of the receptacle or pile).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A suction type end effector, comprising:
   a first set of one or more suction cups of a first size having a first diameter;
   a second set of one or more suction cups of a second size having a second diameter that is smaller than the first diameter;
   a base from which the first set of one or more suction cups and the second set of one or more suction cups extend; and
   a first actuation mechanism configured to (i) configure the first set of suction cups in an inactive position or an active position based on whether the first set of suction cups is selected to engage an item, and (ii) apply suction to at least a subset of the first set of suction cups independently of actuation of the second set of suction cups; and
   a second actuation mechanism configured to (i) configure the second set of suction cups in an inactive position or an active position based on whether the second set of suction cups is selected to engage an item, and (ii) apply suction to at least a subset of the second set of suction cups independently of actuation of the first set of suction cups;

wherein:

one or more of the first actuation mechanism and the second actuation mechanisms are controlled based at least in part on one or more control signals;

the one or more control signals are generated based at least in part on (i) a grasping strategy for grasping the item, and (ii) a set of selected suction cups with which the item is to be engaged;

the set of selected suction cups is determined from among one or more of the first one or more suction cups and the second one or more suction cups to engage the item;

the selection of suction cups is determined based at least in part on an attribute of the item;

the inactive position for the first set of suction cups or the second set of suction cups is a position in which the corresponding set of suction cups is recessed relative to the base; and the one or more control signals is configured to cause the set of selected suction cups to move to an active position in connection with engaging the item.

2. The suction type end effector of claim 1, wherein:
the first set of one or more suction cups are disposed along a first axis; and
the second set of one or more suction cups are disposed along a second axis.

3. The suction type end effector of claim 2, wherein the first axis and the second axis are perpendicular.

4. The suction type end effector of claim 2, wherein the first axis is shorter than the second axis, and the first axis and second axis intersect at a midpoint of the end effector.

5. The suction type end effector of claim 1, wherein the first actuation mechanism is configured to operate at least a first suction cup within the first set of one or more suction cups independently of operation at least a second suction cup within the first set of one or more suction cups.

6. The suction type end effector of claim 1, further comprising a diamond-shaped base plate on which the first set of one or more suction cups and the second set of one or more suction cups are disposed.

7. The suction type end effector of claim 1, wherein:
the first actuation mechanism and the second actuation mechanism are configured to obtain the one or more control signals from a control computer; and
at least one of the one or more signals in response to which the first actuation mechanism and the second actuation mechanism operate is determined according to a grasping strategy.

8. The suction type end effector of claim 7, wherein the grasping strategy indicates a manner by which the item is to be grasped by the suction type end effector.

9. The suction type end effector of claim 7, wherein:
the one or more control signals are selected by the control computer to selectively operate a predetermined combination of the first set of one or more suction cups or the second set of one or more suction cups; and the predetermined combination is determined based on a determination of at least one suction cup to be actuated to grasp the item according to the grasping strategy.

10. The suction type end effector of claim 7, wherein one or more of the first set or second set comprise an extendable suction cup.

11. The suction type end effector of claim 10, wherein the extendable cup is controlled based at least in part on at least one of the one more control signals.

12. The suction type end effector of claim 11, wherein the extendable cup is controlled to extend from the end effector in response to a grasping strategy according to which the end effector reaches further into a bin to grasp an object, or according to which the end effector is to grasp an object from among a clutter of objects.

13. The suction type end effector of claim 11, wherein at least a first cup from the first set and at least a second cup from the second set are different sizes.

14. The suction type end effector of claim 1, wherein the suction type end effector is operatively connected to a robotic arm that is controlled to perform a kitting operation with respect to one or more items.

15. The suction type end effector of claim 14, wherein the kitting operation comprises engaging at least one item of the one or more items with at least one suction cup on the suction type end effector in connection with picking up the at least one item.

16. The suction type end effector of claim 1, wherein the suction type end effector is operatively connected to a robotic arm that is controlled to perform a singulation operation with respect to one or more items.

17. The suction type end effector of claim 16, wherein the singulation operation comprises engaging at least one item of the one or more items with at least one suction cup on the suction type end effector in connection with picking up the at least one item.

18. The suction type end effector of claim 1, wherein the selection of suction cups is further determined based at least in part on a location of the item in relation to a receptacle in which the item is located.

19. The suction type end effector of claim 18, wherein the selection of suction cups is further determined based at least in part on a determination that the item is disposed in a corner of the receptacle.

20. The suction type end effector of claim 1, wherein:
the suction type end effector is operatively connected to a robotic arm; and
the selection of suction cups is determined based at least in part on a location of the item relative to another object in a workspace of the robotic arm or a receptacle in which the item is disposed.

21. The suction type end effector of claim 1, wherein the selection of suction cups is further based on a determination of an optimal arrangement to achieve a desired suction strength grasping speed.

22. The suction type end effector of claim 1, wherein a set of suction cups that are not selected to engage the item remains in the inactive position while the set of selected suction cups engage the item.

* * * * *